United States Patent

[11] 3,566,836

| [72] | Inventor | Merna A. Elfert |
| | | 2807 Byron, Odessa, Tex. 79760 |
| [21] | Appl. No. | 815,985 |
| [22] | Filed | Apr. 14, 1969 |
| [45] | Patented | Mar. 2, 1971 |

[54] PORTABLE WORM-BREEDING CHAMBER
5 Claims, 6 Drawing Figs.

[52] U.S. Cl. .................................................. 119/1, 43/55, 43/121
[51] Int. Cl. ..................................................... A01k 1/00, A01k 29/00
[50] Field of Search............................................ 119/1, 3, 5, 15; 43/55, 121

[56] References Cited
UNITED STATES PATENTS

| 149,198 | 3/1874 | Clark | 119/3 |
| 1,018,277 | 2/1912 | Suhre | 43/121 |
| 2,210,253 | 8/1940 | Neuens | 43/121 |
| 2,935,858 | 5/1960 | Kingery | 43/55X |
| 3,129,692 | 4/1964 | Sanderson | 43/55X |
| 3,401,671 | 9/1968 | Axelrod et al. | 43/55X |
| 3,452,469 | 7/1969 | White | 43/55 |
| 3,468,289 | 9/1969 | Broida | 43/55X |

*Primary Examiner*—Aldrich F. Medbery
*Attorney*—Marcus L. Bates

ABSTRACT: A portable worm-breeding chamber having an upwardly opening enclosure member within which there is disposed a worm excluder with the worm excluder having a central opening therein which defines an opening into the chamber. The worm excluder has a curved edge portion which presents a barrier impossible for the worms to negotiate when they attempt to crawl out of the breeding chamber.

PATENTED MAR 2 1971
3,566,836
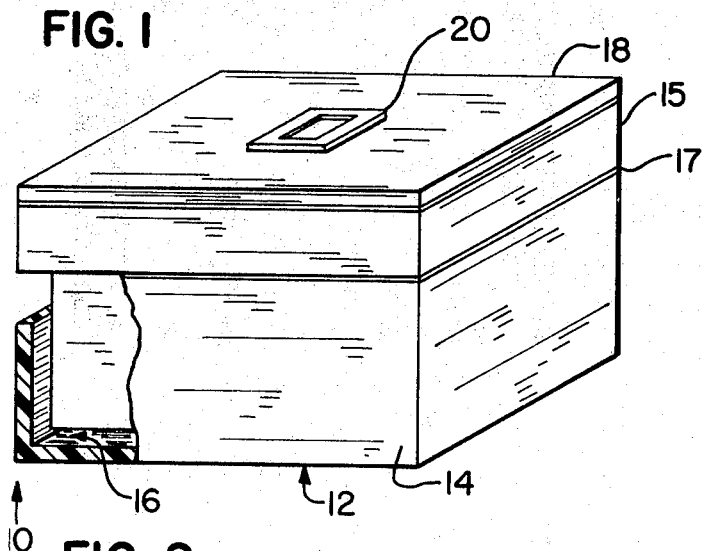
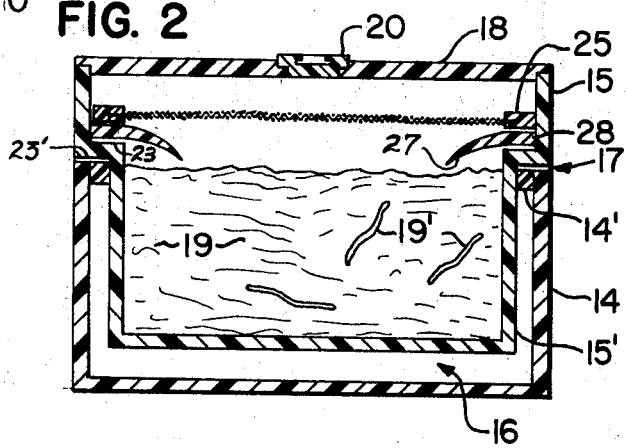
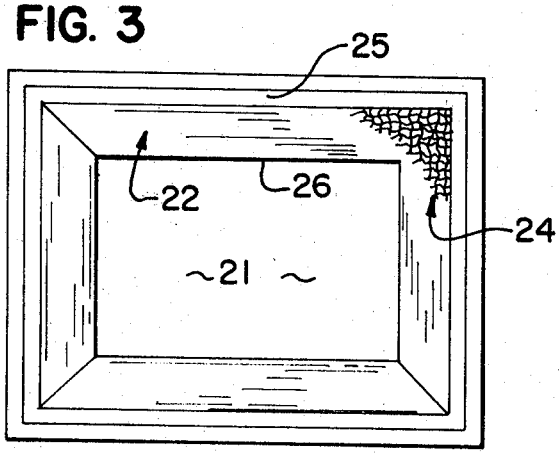
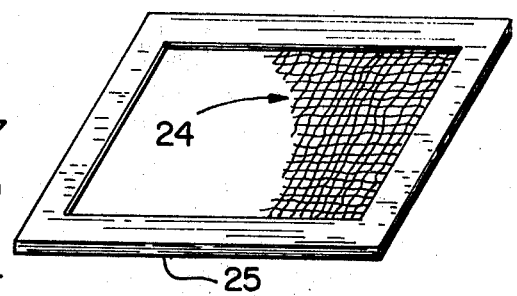
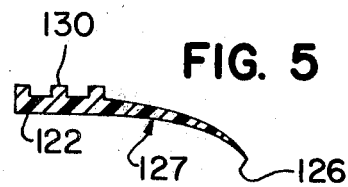
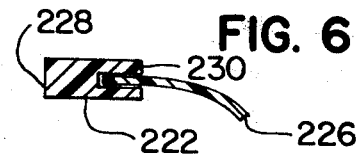
*INVENTOR.*
MERNA A. ELFERT
*BY*
MARCUS L. BATES

PORTABLE WORM-BREEDING CHAMBER

BACKGROUND OF THE INVENTION

Many fishermen grow worms in their back yard in order to have a readily available supply of fish bait on hand for trips to fishing areas. Most individuals who grow worms usually use a rectangular wooden box having a top cover thereon, and with the interior of the box being filled with a suitable worm-growing medium, such as ordinary earth. When the fisherman prepares to depart to his favorite fishing grounds, he generally digs in the box, removes several handsfull of earth containing worms from the box, places the worms along with the earth into a smaller container, and subsequently uses the worms as they are needed from the smaller container. This manner of using homegrown worms is generally wasteful because the worms are continually migrating from the wooden box unless the box is provided with metal seals and a well-seated top. This type loss of worms from a homemade worm box often goes unnoticed by the fisherman. Furthermore, at the end of his fishing trip the fisherman usually gives away his remaining worms when he is ready to return home. On the other hand, the fisherman often underestimates his bait requirements and may have to forego part of his fishing trip because of a lack of worms.

It is therefore desirable to provide fishermen with an almost inexhaustible source of bait by the provision of a portable worm breeding chamber which can be carried along with the fisherman on ordinary fishing trips and which has many improvements which have heretofore been unavailable to those who grow their own worms.

SUMMARY

This invention sets forth a portable worm-growing chamber which is formed by two concentrically arranged enclosure members which are telescoped together to provide a worm-growing chamber and a dead air space. The worm growing chamber has an upper extremity thereof defined by a worm excluder member for preventing worms from crawling out of the growing chamber, while at the same time the excluder defines the opening into the worm chamber. A screen overlays the worm excluder. Most of the enclosure is preferably fabricated of styrofoam in order to admit air while at the same time precluding loss of moisture therefrom, as well as providing an economical insulated chamber.

BRIEF DESCRIPTION OF THE DRAWINGS

FIG. 1 sets forth a perspective view of a portable worm-growing chamber made in accordance with the present invention, with parts thereof being broken away in order to better illustrate the invention;

FIG. 2 is a vertical cross-sectional view of the growing chamber of FIG. 1;

FIG. 3 is a top plan view of the apparatus seen in FIG. 1, with the closure means being removed therefrom;

FIG. 4 is a reduced perspective view showing a part of the apparatus seen in FIGS. 2 and 3;

FIG. 5 is an enlarged cross-sectional view of part of the apparatus seen in FIG. 2; and FIG. 6 is a modification of FIG. 5.

DETAILED DESCRIPTION OF THE PREFERRED EMBODIMENT

As seen in FIG. 1, in conjunction with FIGS. 2, 3, and 4, numeral 10 indicates a portable worm-breeding and growing chamber made in accordance with the present invention, and having a lower upwardly opening enclosure 12, a sidewall of which is seen at 14. An upper or second upwardly opening enclosure member 15 is telescopingly received within the lower enclosure member in a manner to leave a dead air space 16 therebetween. Each enclosure member is mated or joined together along interface 17 which circumferentially extends about the entire breeding chamber. Closure member 18 is removably received upon the upper terminal end of the upper enclosure member.

The lower portion of the upper enclosure member which forms the breeding chamber is partially filled with peat moss or the like 19 and contains a multitude of worms 19' therein. A ventilator 20 in the form of a removable plug is placed within the closure member. As seen in FIG. 3, an opening 21 is formed by the inside edge portion of the illustrated worm excluder 22.

The excluder is received in abutting relationship with respect to shoulder 23 of an inwardly directed ledge. The ledge also forms a second shoulder 23' which is diametrically opposed to the first shoulder, and which cooperates with the upper terminal end of the lower closure member.

A screen 24 is suitably stretched between the diametrically opposed parts of a frame member 25, with the screen being removably received in superimposed relationship upon the upper flange portion of the worm excluder.

The worm excluder has an inside edge portion 26 which is curved in a downward direction as indicated by the arrow at numeral 27, thereby providing an impassible barrier for the worms to negotiate when attempting to climb out of the breeding and growing chamber. The outside marginal edge portion of the worm excluder is in the form of a frame having an outer edge 28.

FIG. 5 illustrates another form of the worm excluder that is substantially identical to the form presented in FIGS. 2 and 3, but which is additionally provided with the circumferentially extending ribs 130.

FIG. 6 shows still another form of the worm excluder which is comprised of a frame 222 having an inwardly and downwardly curved plastic or sheet metal member terminating at 226. The outside edge portion of the frame is defined by numeral 228. A marginal edge portion of the sheet metal is received within the frame member as indicated by the numeral 230.

OPERATION

The apparatus of FIGS. 1 through 3 is assembled by placing the lower enclosure member on a suitable supporting surface so as to enable the upper enclosure member to be slidably placed therein in a telescoping manner in order to provide a dead air space 16. The purpose of the dead air space 16 is to insulate the worm-breeding and growing chamber as well as to provide a monocoquelike structure which greatly rigidifies the entire assembly. With this type construction, should the outer container become damaged, loss or injury of the worms is avoided. Furthermore, the outer enclosure member makes the breeding chamber more acceptable to members of the household who might otherwise object to its presence in that it can be pointed out that the worms must penetrate two walls prior to becoming exposed to their view.

The worm excluder is preferably cemented onto the ledge which circumferentially extends about the entire chamber on the inside and which jointly forms spaced apart diametrically opposed shoulders on the outside for receiving the upper terminal end of the lower enclosure member. With the apparatus assembled in the above manner, a mixture of peat moss, several handsfull of material containing worms in various stages of development, moisture, and suitable worm food are charged through the excluder and into the breeding chamber. The particular strain of worms employed is a matter of choice, although Applicant prefers Tennessee Red Worms or Georgia Wigglers since these hearty worms rapidly multiply and are believed to be more attractive to fish.

The screen is next superimposed over the worm excluder for the purpose of keeping insects and varments therefrom and to form a moss spillage barrier in the event of accidental tipping of the chamber. The closure means is next placed on the breeding chamber and the ventilator preferably removed to augment the natural circulation of air which penetrates the sidewalls of the styrofoam enclosure members.

It has been found advantageous to fabricate both enclosure members from styrofoam because water cannot pass through the walls thereof, yet sufficient ventilation permeates the wall. This favorable environment induces rapid multiplication of the worms. A container measuring 14×14×14 inches can provide ample worms for an average family that goes fishing with a frequency of less than once a month. Because of the small size and light weight of the portable breading chamber, the fisherman can conveniently carry it while he is fishing.

In breeding chambers of the prior art, the worms will crawl up the sides of the enclosure and onto the screen as they forage for food. This causes an undesirable condition for each time the screen is removed, worms invariably fall from the screen and onto the floor, which naturally is objectionable to some people. Without a screen, and without the excluder of the present invention, an even more undesirable condition exists because the worms will cluster on the underside of the closure means. Accordingly, the present excluder prevents worms, while foraging for food, from crawling past the inside edge potion 26 because the worms simply cannot negotiate the sharp curve of the excluder, and therefore must fall back into the chamber.

The enclosure members are preferably fabricated from styrofoam with the edges at interface 17 being cemented together. The worm excluder is preferably made of injection-molded plastic so as to attain a one-piece rigid construction. With the upper and lower enclosure members cemented together and with the worm excluder rigidly affixed by a suitable adhesive to the upper shoulder formed by the ledge, the resulting structure is adequately strong for the most robust fisherman.

I claim:

1. A portable worm-growing apparatus which includes an upwardly opening enclosure member having an upper terminal end, sidewalls, and a bottom, with the interior of said enclosure member forming a worm-growing chamber in which worms would grow if kept living therein;

means forming a second upwardly opening enclosure member having an upper terminal end, a bottom, and sidewalls;

the first recited enclosure member having a circumferentially extending ledge which forms a shoulder with said shoulder being spaced intermediate said bottom and said terminal end of said first recited enclosure member;

said upper terminal end of said second enclosure member engaging said shoulder with the wall and bottom of said second enclosure member spaced from said first sidewalls and bottom cooperating with a portion of the first enclosure member to thereby form a dead air space about the worm chamber;

a closure member adapted to be received by the first said upper terminal end;

a worm excluder for preventing worms from crawling out of said chamber, said excluder being received by said ledge and within said enclosure member and spaced apart from said upper terminal end and said bottom to thereby define said worm-growing chamber between said excluder and said bottom;

said excluder having means forming an opening into said worm chamber, the outer edge portion of said excluder being defined by a frame from which there depends an inwardly extending member which terminates in an edge portion with said edge portion defining the opening into said worm chamber;

said frame being coextensive with and placed adjacent to said ledge to thereby leave said inwardly extending edge portion spaced apart from said sidewalls;

a frame member and a screen, said screen being attached thereto with said frame member being superimposed upon said excluder frame and forming an insect barrier and retainer for said first enclosure whereby a worm must encounter said inwardly directed edge portion of said excluder when attempting to crawl from the chamber.

2. The portable worm grower of claim 1, wherein said ledge further forms another shoulder, the first shoulder and said another shoulder being diametrically opposed with respect to each other, said excluder frame being attached to said another shoulder.

3. The portable worm grower of claim 1 wherein said enclosure member is fabricated from styrofoam to thereby enable air to enter said worm growing chamber.

4. The portable worm grower of claim 1 wherein the inwardly extending member of said excluder is curved and is fabricated from metal.

5. The portable worm grower of claim 1 wherein the inwardly extending member of said excluder is fabricated from plastic and is reduced in cross-sectional area in a direction towards the inwardly directed edge portion.